(12) United States Patent
Cleary et al.

(10) Patent No.: US 10,953,644 B2
(45) Date of Patent: Mar. 23, 2021

(54) COLD FORMED 3D COVER GLASS ARTICLES AND FORMING PROCESS TO MAKE THE SAME

(71) Applicant: CORNING INCORPORATED, Corning, NY (US)

(72) Inventors: Thomas Michael Cleary, Elmira, NY (US); Yawei Sun, Elmira, NY (US); Chunhe Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 210 days.

(21) Appl. No.: 16/342,009

(22) PCT Filed: Oct. 20, 2017

(86) PCT No.: PCT/US2017/057529
§ 371 (c)(1),
(2) Date: Apr. 15, 2019

(87) PCT Pub. No.: WO2018/075853
PCT Pub. Date: Apr. 26, 2018

(65) Prior Publication Data
US 2019/0248124 A1   Aug. 15, 2019

Related U.S. Application Data

(60) Provisional application No. 62/410,482, filed on Oct. 20, 2016.

(51) Int. Cl.
*B32B 37/10*       (2006.01)
*B29C 65/00*       (2006.01)
(Continued)

(52) U.S. Cl.
CPC ........ *B32B 37/10* (2013.01); *B29C 66/81463* (2013.01); *B29C 66/81465* (2013.01);
(Continued)

(58) Field of Classification Search
None
See application file for complete search history.

(56) References Cited

U.S. PATENT DOCUMENTS 4,455,338 A    6/1984  Henne
4,899,507 A    2/1990  Mairlot
(Continued)

FOREIGN PATENT DOCUMENTS

CN    201989544 U    9/2011
CN    103587161 A    2/2014
(Continued)

OTHER PUBLICATIONS

International Search Report and Written Opinion of the International Searching Authority; PCT/US2017/057529; dated Jan. 4, 2018; 13 pages; European Patent Office.

*Primary Examiner* — Barbara J Musser

(57) ABSTRACT

In some embodiments, a process comprises applying an adhesive layer to a substrate having a developable shape. The process further comprises initially applying a force to press a thin glass layer against the adhesive layer along a generation line. The generation line moves across the substrate to cold-form the thin glass layer into the shape of the substrate, while maintaining the application of force on areas of the substrate over which the generation line has passed. The application of force is maintained on areas of the substrate over which the generation line has passed until the adhesive cures.

19 Claims, 15 Drawing Sheets

(51) Int. Cl.
  *B32B 37/00* (2006.01)
  *B32B 3/26* (2006.01)
  *B32B 37/12* (2006.01)
  *B32B 37/18* (2006.01)
  *B29L 31/34* (2006.01)
  *B32B 38/18* (2006.01)
  *B32B 17/10* (2006.01)
  *B32B 17/06* (2006.01)
  *B32B 7/12* (2006.01)
  *B32B 15/04* (2006.01)
  *B32B 15/20* (2006.01)
  *C03C 3/091* (2006.01)
  *C03C 3/093* (2006.01)

(52) U.S. Cl.
  CPC ............... *B32B 3/266* (2013.01); *B32B 7/12* (2013.01); *B32B 15/04* (2013.01); *B32B 15/20* (2013.01); *B32B 17/06* (2013.01); *B32B 17/064* (2013.01); *B32B 17/10036* (2013.01); *B32B 17/1077* (2013.01); *B32B 17/10119* (2013.01); *B32B 17/10137* (2013.01); *B32B 17/10743* (2013.01); *B32B 17/10761* (2013.01); *B32B 17/10788* (2013.01); *B32B 17/10816* (2013.01); *B32B 17/10862* (2013.01); *B32B 37/0046* (2013.01); *B32B 37/12* (2013.01); *B32B 37/18* (2013.01); *C03C 3/091* (2013.01); *C03C 3/093* (2013.01); *B29L 2031/3475* (2013.01); *B32B 38/1866* (2013.01); *B32B 2250/02* (2013.01)

(56) References Cited

U.S. PATENT DOCUMENTS

| | | | |
|---|---|---|---|
| 4,985,099 A | 1/1991 | Mertens et al. |
| 5,154,117 A | 10/1992 | Didelot et al. |
| 5,300,184 A | 4/1994 | Masunaga |
| 6,086,983 A | 7/2000 | Yoshizawa |
| 6,332,690 B1 | 12/2001 | Murofushi |
| 6,582,799 B1 | 6/2003 | Brown et al. |
| 6,903,871 B2 | 6/2005 | Page |
| 7,375,782 B2 | 5/2008 | Yamazaki et al. |
| 8,344,369 B2 | 1/2013 | Yamazaki et al. |
| 8,549,885 B2 | 10/2013 | Dannoux et al. |
| 8,833,106 B2 | 9/2014 | Dannoux et al. |
| 8,912,447 B2 | 12/2014 | Leong et al. |
| 9,061,934 B2 | 6/2015 | Bisson et al. |
| 9,593,042 B2 | 3/2017 | Hu et al. |
| 9,802,485 B2 | 10/2017 | Masuda et al. |
| 9,895,975 B2 | 2/2018 | Lee et al. |
| 9,902,640 B2 | 2/2018 | Dannoux et al. |
| 9,931,817 B2 | 4/2018 | Rickerl |
| 9,963,374 B2 | 5/2018 | Jouanno et al. |
| 10,017,033 B2 | 7/2018 | Fisher et al. |
| 10,131,118 B2 | 11/2018 | Kang et al. |
| 2004/0069770 A1 | 4/2004 | Cary et al. |
| 2007/0223121 A1 | 9/2007 | Franck et al. |
| 2007/0291384 A1 | 12/2007 | Wang |
| 2009/0179840 A1 | 7/2009 | Tanaka et al. |
| 2009/0185127 A1 | 7/2009 | Tanaka et al. |
| 2010/0031590 A1 | 2/2010 | Buchwald et al. |
| 2012/0202030 A1 | 8/2012 | Kondo et al. |
| 2013/0088441 A1 | 4/2013 | Chung et al. |
| 2014/0014260 A1 | 1/2014 | Chowdhury et al. |
| 2015/0246507 A1 | 9/2015 | Brown et al. |
| 2015/0336357 A1 | 11/2015 | Kang et al. |
| 2016/0052241 A1 | 2/2016 | Zhang |
| 2016/0207290 A1 | 7/2016 | Cleary et al. |
| 2016/0297176 A1 | 10/2016 | Rickerl |
| 2016/0306451 A1 | 10/2016 | Isoda et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0197561 A1 | 7/2017 | McFarland |
| 2017/0217815 A1 | 8/2017 | Dannoux et al. |
| 2017/0327402 A1 | 11/2017 | Fujii et al. |
| 2017/0349473 A1 | 12/2017 | Moriya et al. |
| 2018/0050948 A1 | 2/2018 | Faik et al. |
| 2018/0111569 A1 | 4/2018 | Falk et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0188869 A1 | 7/2018 | Boggs et al. |
| 2018/0210118 A1 | 7/2018 | Gollier et al. |
| 2018/0245125 A1 | 8/2018 | Tsai et al. |
| 2018/0345644 A1 | 12/2018 | Kang et al. |
| 2019/0039935 A1 | 2/2019 | Couillard et al. |

FOREIGN PATENT DOCUMENTS

| | | |
|---|---|---|
| CN | 203825589 U | 9/2014 |
| CN | 102566841 B | 4/2015 |
| CN | 104679341 A | 6/2015 |
| CN | 204463066 U | 7/2015 |
| CN | 104843976 A | 8/2015 |
| CN | 105511127 A | 4/2016 |
| DE | 4415878 A1 | 11/1995 |
| DE | 102004022008 A1 | 12/2004 |
| DE | 102013214108 A1 | 2/2015 |
| EP | 316224 A1 | 5/1989 |
| EP | 1046493 A2 | 10/2000 |
| FR | 2918411 B1 | 10/2013 |
| FR | 3012073 A1 | 4/2015 |
| GB | 2011316 A | 7/1979 |
| JP | 3059337 U | 6/1991 |
| JP | 2015092422 A | 5/2015 |
| JP | 2016031696 A | 3/2016 |
| JP | 35976561 B2 | 8/2016 |
| JP | 2016173794 A | 9/2016 |
| JP | 2016203609 A | 12/2016 |
| WO | 9801649 A1 | 1/1998 |
| WO | 2007108861 A1 | 9/2007 |
| WO | 2012058084 A2 | 5/2012 |
| WO | 2015031594 A2 | 3/2015 |
| WO | 2016007815 A1 | 1/2016 |
| WO | 2016044360 A1 | 3/2016 |
| WO | 2016196531 A1 | 12/2016 |
| WO | 2016196546 A1 | 12/2016 |
| WO | 2017155932 A1 | 9/2017 |
| WO | 2018005646 A1 | 1/2018 |
| WO | 2018009504 A1 | 1/2018 |
| WO | 2018075853 A1 | 4/2018 |
| WO | 2018081068 A1 | 5/2018 |
| WO | 2018125683 A1 | 7/2018 |
| WO | 2018200454 A1 | 11/2018 |

COLD FORMED 3D COVER GLASS ARTICLES AND FORMING PROCESS TO MAKE THE SAME

CROSS-REFERENCE TO RELATED APPLICATIONS

This application is a national stage application under 35 U.S.C. § 371 of International Patent Application Serial No. PCT/US2017/57529, filed on Oct. 20, 2017, which claims the benefit of priority under 35 U.S.C. § 119 of U.S. Provisional Application Ser. No. 62/410,482, filed on Oct. 20, 2016, the contents of which are relied upon and incorporated herein by reference in their entireties.

BACKGROUND

The present disclosure relates to curved cold-formed glass substrates, articles including such glass substrates, and related processes.

Curved glass substrates are desirable in many contexts. One such context is for use as a cover glass for a curved display, which may be incorporated into an appliance, an architectural element (e.g., wall, window, modular furniture, shower door, mirrors etc.), a vehicle (e.g., automobiles, aircraft, sea craft and the like). Existing methods of forming such curved glass substrates, such as thermal forming, have drawbacks including optical distortion and surface marking.

BRIEF SUMMARY

In some embodiments, the present disclosure is directed to articles comprising a cold-formed glass thin glass layer bonded to a non-planar substrate, and methods of making such articles.

In some embodiments, a process comprises applying an adhesive layer to a substrate having a developable shape. The process further comprises initially applying a force to press a thin glass layer against the adhesive layer along a generation line. The generation line moves across the substrate to cold-form the thin glass layer into the shape of the substrate, while maintaining the application of force on areas of the substrate over which the generation line has passed. The application of force is maintained on areas of the substrate over which the generation line has passed until the adhesive cures.

In some embodiments, the embodiments of any of the preceding paragraphs may further include the substrate having a non-planar developable shape.

In some embodiments, the embodiments of any of the preceding paragraphs may further include the substrate having a complex developable shape, where the substrate has a first portion with a planar shape and a second portion with a curvature.

In some embodiments, the embodiments of any of the preceding paragraphs may further include the substrate having a complex developable shape, the substrate having a first portion with a convex curvature and a second portion with a concave curvature.

In some embodiments, the embodiments of any of the preceding paragraphs may further include initially applying the force by a first roller of a roller tape having a plurality of rollers. The generation line is defined by the first roller to pass over an area of the substrate and the application of force is maintained by at least one of the plurality of rollers.

In some embodiments, the embodiments of any of the preceding paragraphs may further include each of the plurality of rollers attached to at least one pin.

In some embodiments, the embodiments of any of the preceding paragraphs may further include maintaining a constant pressure on each pin by an actuator mechanism. The actuator mechanism is selected from the group consisting of hydraulic, pneumatic, electric, and mechanical.

In some embodiments, the embodiments of any of the preceding paragraphs may further include a pressure chamber applying a common pressure on each pin that is attached to a roller that is applying force on areas of the substrate.

In some embodiments, the embodiments of any of the preceding paragraphs may further include a flexible mold used to maintain the application of force on areas of the substrate over which the generation line has passed.

In some embodiments, the embodiments of any of the preceding paragraphs may further include the process being performed using an array of pins controllable by actuators to either apply force or not apply force. The initial force is applied by actuating one or more pins. The generation line is defined by the position of sequentially actuated pins and the application of force is maintained by actuated pins that do not move relative to the substrate after the generation line has passed, and until the adhesive is cured.

In some embodiments, the embodiments of any of the preceding paragraphs may further include maintaining a uniform force on areas of the substrate over which the generation line has passed.

In some embodiments, the embodiments of any of the preceding paragraphs may further include the generation line moving across the substrate at all points in the direction of a non-zero principal curvature of the substrate.

In some embodiments, the embodiments of any of the preceding paragraphs may further include the adhesive layer being a structural adhesive having high optical transparency.

In some embodiments, the embodiments of any of the preceding paragraphs may further include the thin glass layer having a thickness of 0.05 mm to 2 mm, more preferably 0.3 mm to 1.1 mm.

In some embodiments, the embodiments of any of the preceding paragraphs may further include the roller having a radius smaller than the smallest bending radius of the substrate; preferably the roller has a radius of 5 mm to 20 mm.

In some embodiments, the embodiments of any of the preceding paragraphs may further include that the radius of the roller is 10% to 20% of the smallest bending radius of the substrate.

In some embodiments, the embodiments of any of the preceding paragraphs may further include the substrate comprising an opening over which the thin glass layer forms a developable shape defined by the shape of the substrate adjacent to the opening.

In some embodiments, the embodiments of any of the preceding paragraphs may further include an article formed by the process of applying an adhesive layer to a substrate having a developable shape. The process further comprising initially applying a force to press a thin glass layer against the adhesive layer along a generation line. The generation line moves across the substrate to cold-form the thin glass layer into the shape of the substrate, while maintaining the application of force on areas of the substrate over which the generation line has passed. The application of force is maintained on areas of the substrate over which the generation line has passed until the adhesive cures.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
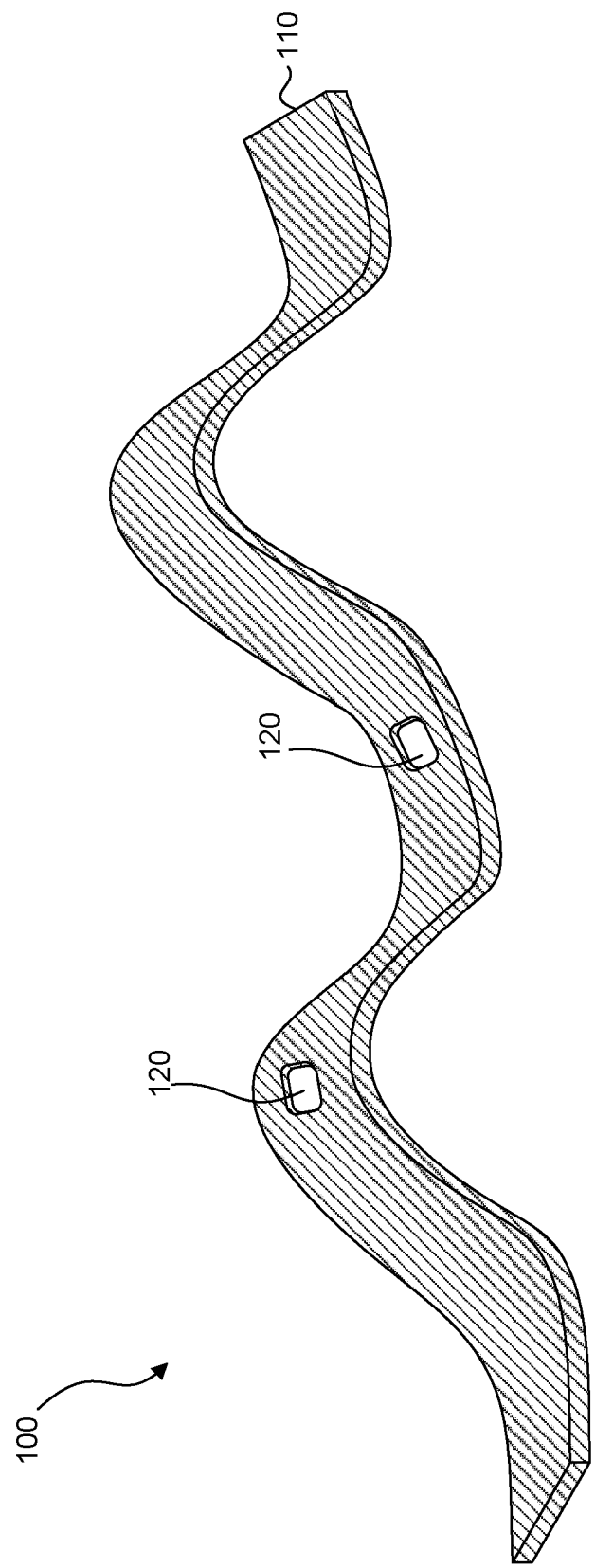
FIG. 1 illustrates a non-planar rigid substrate with a required 3D shape.

Vehicle manufacturers are creating interiors that better connect, protect and safely inform today's drivers and passengers. As the industry moves towards autonomous driving, there is a need for creating large format appealing displays. There is already a trend towards larger displays including touch functionality in the new models from several OEMs. Such trends are also emerging in appliances, architectural elements (e.g., wall, window, modular furniture, shower door, mirrors etc.), and other vehicles (e.g., aircraft, sea-craft and the like). However, most of these displays consist of two dimensional plastic cover lenses.

Due to these emerging trends in the automotive interior industry and related industries, there is a need to develop a low cost technology to make three-dimensional transparent surfaces. Strengthened glass materials, such as chemically strengthened, thermally strengthened and/or mechanically strengthened glass materials are particularly desirable for use as such surfaces, particularly where the glass substrate is used as a curved cover glass for a display.

However, many methods for forming curved glass surfaces involve subjecting glass substrates to thermal forming processes (that include heating a glass substrate to a temperature above the transition temperature of the glass). Such processes can be energy intensive due to the high temperatures involved and such processes add significant cost to the product. Furthermore, thermal forming processes may cause strength degradation or may damage any coatings present on the glass substrate, such as antireflective (AR) coatings or ink coatings. Moreover, thermal forming processes may impart undesirable characteristics onto the glass itself, such as distortion and marking.

A planar glass substrate may be "cold-formed" to have a curved or three-dimensional shape. In some embodiments, "cold-forming" refers to bending the glass substrate at temperatures below the transition temperature of the glass. In some embodiments, cold-forming occurs at temperatures below 80° F. A cold-formed glass substrate has opposing major surfaces and a curved shape. The opposing major surfaces exhibit surface stresses that differ from one another that are created during cold-forming. The stresses include surface compressive stresses generated by the cold-forming process. These stresses are not thermally relaxed because the glass substrate is maintained at temperatures well below the glass transition temperature.

In some embodiments, a cold-formed glass substrate forms a "developable" surface. A developable surface is a surface with zero Gaussian curvature—i.e., a surface that can be flattened into a plane without stretching or compressing within the plane of the surface. Examples of developable surfaces include cones, cylinders, oloids, tangent developable surfaces, and portions thereof. A surface that projects onto a single curved line is a developable surface. On the other hand, most smooth surfaces have a non-zero Gaussian curvature and are non-developable surfaces—sphere is an example of a non-developable shape or surface since it cannot be rolled into a plane.

At any point on a surface, there can be found a normal vector that is at right angles to the surface; planes containing the normal vector are called normal planes. The intersection of a normal plane and the surface will form a curve called a normal section and the curvature of this curve is the normal curvature. The normal curvature varies depending upon which normal plane is considered. One such plane will have a maximum value for such curvature, and another will have a minimum value. These maximum and minimum values are called the principal curvatures.

Geometrically, Gaussian curvature is defined as the intrinsic measure of curvature of any surface, depending only on the distances that are measured on the surface, not on the way it is isometrically embedded in any space. Gaussian curvature can also be defined as the product of principal curvatures, $K_{max}$ and $K_{min}$. Since the Gaussian curvature of a developable surface is zero everywhere, the maximum and minimum principal curvatures of a developable surface can be written as Equation (1):

$$K_{max} = H + |H|, K_{min} = H - |H| \quad (1)$$

$$K_{max} = 2H, \kappa_{min} = 0 \text{ when } H > 0, \quad (2)$$

$$K_{max} = 0, \kappa_{min} = 0 \text{ when } H = 0, \quad (3)$$

$$K_{max} = 0, \kappa_{min} = 2H \text{ when } H < 0, \quad (4)$$

where H is the mean curvature of the surface.

$K_{max}$ in equation (2) and $K_{min}$ in equation (4) are termed as the non-zero principal curvature of a surface.

In some embodiments, a cold-formed glass substrate has a complex developable shape. A complex developable shape refers to a combination of two or more developable shapes such as cones, cylinders, oloids, planes and tangent developable surfaces. For instance, a complex developable shape may be a combination of at least a planar and at least a concave surface, or at least a planar and at least a convex surface, or at least a concave and at least a convex surface.

In some embodiments, a complex developable shape may also be formed by a combination of planar, conical, cylindrical, and other developable surfaces and involve both inward and outward bending. In some embodiments, the combination of planar, conical, cylindrical, and other developable surfaces may be in such a way that no sharp edges form while going from one developable surface to another.

In some embodiments, a complex developable shape or a complex developable surface may include one or more planar portions, one or more conical portions, one or more cylindrical portions, and/or one or more other developable surface portions.

In some embodiments, as used herein, "generation line" refers to a line that defines a boundary between areas of a substrate where force has already been applied to press a thin glass layer against substrate, and areas of the substrate where such force has not yet been applied. The generation line is aligned with the zero principal curvature direction of the 3D shape. During a process of bonding the thin glass layer to the substrate, the generation line moves across the thin glass layer to sequentially press different parts of the thin glass layer against the substrate. Once the generation line has passed a particular part of the thin glass layer, the force is maintained until an adhesive holding the thin glass layer against the substrate is cured.

Force may be "maintained" in an area by application of force in spaced or periodic parts of the area. For example, once a roller tape passes over an area, or spaced pins have been actuated, spaced rollers or pins maintain the force. Gaps between the rollers do not negate maintenance of force, because the spaced rollers hold the thin glass layer against the substrate sufficiently well that the thin glass layer and the substrate do not move significantly relative to each other. If each pin or roller applies the same force, the maintained force is considered "uniform" even if parts of the area over which the generation line has passed are in contact with a roller or pin while others are in between rollers/pins.

In some embodiments, "bending radius" as used herein, mathematically defined, refers to the non-zero principal radius of curvature at a given point where there is bending.

In some embodiments, the article may include a glass substrate that is provided as a sheet and that is strengthened (prior to being shaped into some embodiments of the article described herein). For example, the glass substrate may be strengthened by any one or more of thermal strengthening, chemical strengthening, and mechanical strengthening or by a combination thereof. In some embodiments, strengthened glass substrate have a compressive stress (CS) layer extending from a surface of the substrate thereof to a compressive stress depth (or depth of compressive stress layer or DOL). The depth of compression is the depth at which compressive stress switches to tensile stress. The region within the glass substrate exhibiting a tensile stress is often referred to as a central tension or CT layer.

As used herein, "thermally strengthened" refers to glass substrates that are heat treated to improve the strength of the substrate. In thermally-strengthened glass substrates, the CS layer is formed by heating the substrate to an elevated temperature above the glass transition temperature (i.e., near or approaching the glass softening point), and then cooling the glass surface regions more rapidly than the inner regions of the glass. The differential cooling rates between the surface regions and the inner regions generates a residual CS layer at the surfaces.

Factors that impact the degree of surface compression generated by thermal strengthening processes include the air-quench temperature, volume, and other variables that create a surface compression of at least 10,000 pounds per square inch (psi). In chemically strengthened glass substrates, the replacement of smaller ions by larger ions at a temperature below that at which the glass network can relax produces a distribution of ions across the surface of the glass that results in a stress profile. The larger volume of the incoming ion produces the CS layer extending from a surface and the CT layer in the center of the glass. Chemical strengthening may be achieved by an ion exchange process, which includes immersion of a glass substrate into a molten salt bath for a predetermined period of time to allow ions at or near the surface(s) of the glass substrate to be exchanged for larger metal ions from the salt bath. In some embodiments, the temperature of the molten salt bath is from about 375° C. to about 450° C. and the predetermined time period is in the range from about four to about eight hours. In one example, sodium ions in a glass substrate are replaced by potassium ions from the molten bath, such as a potassium nitrate salt bath, though other alkali metal ions having larger atomic radii, such as rubidium or cesium, can replace smaller alkali metal ions in the glass. In another example, lithium ions in a glass substrate are replaced by potassium and/or sodium ions from the molten bath that may include potassium nitrate, sodium nitrate or a combination thereof, although other alkali metal ions having larger atomic radii, such as rubidium or cesium, can replace smaller alkali metal ions in the glass. In some embodiments, smaller alkali metal ions in the glass substrate can be replaced by Ag+ ions. Similarly, other alkali metal salts such as, but not limited to, sulfates, phosphates, halides, and the like may be used in the ion exchange process. The glass substrate may be immersed in a single bath or in multiple and successive baths which may have the same or different composition and/or temperature from one another. In some embodiments, the immersion in such multiple baths may be for different periods of time from one another.

In mechanically-strengthened glass substrates, the CS layer is generated by a mismatch of the coefficient of thermal expansion between portions of the glass substrate.

In strengthened glass substrates, the DOL is related to the CT value by the following approximate relationship: (Equation 5)

$$CT \cong \frac{CS \times DOL}{thickness - 2 \times DOL} \quad (5)$$

where thickness is the total thickness of the strengthened glass substrate and DOL depth of layer (DOL) is the depth of the compressive stress. Unless otherwise specified, central tension CT and compressive stress CS are expressed herein in MegaPascals (MPa), whereas thickness and depth of layer DOL are expressed in millimeters or microns.

In some embodiments, a strengthened glass substrate can have a surface CS of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. In some embodiments, the surface CS is the maximum CS in the glass substrate. The strengthened glass substrate may have a DOL of 15 micrometers or greater, 20 micrometers or greater (e.g., 25, 30, 35, 40, 45, 50 micrometers or greater) and/or a maximum CT value of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass substrate has one or more of the following: a surface CS greater than 500 MPa, a DOL greater than 15 micrometers, and a maximum CT of greater than 18 MPa.

The CS and DOL may be determined by surface stress meter such the commercially available FSM-6000 instrument, manufactured by Luceo Co., Ltd. (Tokyo, Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method.

The materials for the glass substrates may be varied. The glass substrates used to form the articles described herein can be amorphous or crystalline. In this regard, the use of the term "glass" is general and is intended to encompass more than strictly amorphous materials. Amorphous glass substrates according to some embodiments can be selected from soda lime glass, alkali aluminosilicate glass, alkali containing borosilicate glass and alkali aluminoborosilicate glass. Examples of crystalline glass substrates can include glass-ceramics, sapphire or spinel. Examples of glass-ceramics include $Li_2O$—$Al_2O_3$—$SiO_2$ system (i.e. LAS-System) glass ceramics, MgO—$Al_2O_3$—$SiO_2$ System (i.e. MAS-System) glass ceramics, glass ceramics including crystalline phases of any one or more of mullite, spinel, α-quartz, β-quartz solid solution, petalite, lithium disilicate, β-spodumene, nepheline, and alumina.

Glass substrates may be provided using a variety of different processes. For example, exemplary glass substrate forming methods include float glass processes and down-draw processes such as fusion draw and slot draw. A glass substrate prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrates having a uniform thickness that possess relatively pristine surfaces. Because the average flexural strength of the glass substrate is controlled by the amount and size of surface flaws, a pristine surface that has had minimal contact has a higher initial strength. Down-drawn glass substrate may be drawn into a sheet having a thickness of less than about 2 millimeters. In addition, down drawn glass substrate have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing sheet of glass. The fusion draw method offers the advantage that, because the two glass films flowing over the channel fuse together, neither of the outside surfaces of the resulting sheet of glass comes in contact with any part of the apparatus. Thus, the surface properties of the fusion drawn sheet of glass are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous sheet and into an annealing region.

Exemplary compositions for use in the glass substrate will now be described. One example glass composition comprises $SiO_2$, $B_2O_3$ and $Na_2O$, where $(SiO_2+B_2O_3) \geq 66$ mol. %, and $Na_2O \geq 9$ mol. %. Suitable glass compositions, in some embodiments, further comprise at least one of $K_2O$, MgO, and CaO. In some embodiments, the glass compositions can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In some embodiments, an alkali aluminosilicate glass composition comprises alumina, at least one alkali metal and, in some embodiments, greater than 50 mol. % $SiO_2$, in some embodiments at least 58 mol. % $SiO_2$, and in some embodiments at least 60 mol. % $SiO_2$, wherein the ratio $((Al_2O_3+B_2O_3)/\Sigma \text{ modifiers}) > 1$, where in the ratio the components are expressed in mol. % and the modifiers are alkali metal oxides. This glass composition, in some embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio (($Al_2O_3+B_2O_3$)/Σ modifiers)>1.

In some embodiments, the glass substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $SiO_2+B_2O_3+CaO$≤69 mol. %; $Na_2O+K_2O+B_2O_3+MgO+CaO+SrO$>10 mol. %; 5 mol. % MgO+CaO+SrO≤8 mol. %; ($Na_2O+B_2O_3$)—$Al_2O_3$≤2 mol. %; 2 mol. % $Na_2O$—$Al_2O_3$ 6 mol. %; and 4 mol. % ($Na_2O+K_2O$)—$Al_2O_3$ 10 mol. %.

In some embodiments, the glass substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

In some embodiments, the compositions used for a glass substrate may be batched with 0-2 mol. % of at least one fining agent selected from a group that includes $Na_2SO_4$, NaCl, NaF, NaBr, $K_2SO_4$, KCl, KF, KBr, and $SnO_2$.

The articles may be a single sheet of glass or a laminate. According to some embodiments, a laminate refers to opposing glass substrates, such as the glass substrates described herein. In some embodiments, the glass substrates may be separated by an interlayer, for example, poly(vinyl butyral) (PVB), ethylenevinylacetate (EVA), polyvinyl chloride (PVC), ionomers, and thermoplastic polyurethane (TPU). A glass substrate forming part of a laminate can be strengthened (chemically, thermally, and/or mechanically) as described above. Thus, laminates according to some embodiments comprise at least two glass substrates bonded together by an interlayer in which a first glass substrate defines a first ply and a second glass substrate defines a second ply. The second ply may face the user of a display (i.e., the interior of a vehicle, the user facing panel of an appliance or the user facing surface of an architectural element), while the first play may face the opposite direction. In vehicle applications such as automotive glazings, the first ply is exposed to a vehicle or automobile interior and the second ply faces an outside environment of the automobile. In some embodiments, the user interface may be from the interior, from the exterior or from both the interior and the exterior of the laminate, when used in automotive glazings. In vehicle applications such as automotive interiors, the second ply is unexposed and placed on an underlying support (e.g., a display, dashboard, center console, instrument panel, seat back, seat front, floor board, door panel, pillar, arm rest etc.), and the first ply is exposed to the vehicle or automobile interior and thus the user. In architectural applications, the second ply is exposed to a building, room, or furniture interior and the first ply faces an outside environment of the building, room or furniture.

Although various specific glasses are described herein, in some embodiments, any cold-formable glass may be used.

Some embodiments of the articles disclosed herein are useful in automobile interiors because such articles provide a curved cover compatible with curved displays. To be compatible with a curved display, a cover should match the shape of the curved display closely to insure optimal fit and enable a high quality viewing. It is also desirable to provide a cover that is high optical quality and cost effective. Thermal forming a cover to the precise shape presents challenges in attaining that desired shape. In addition, when glass is used, it is a challenge to minimize the downside effects of heating the cover to its softening point (e.g., distortion, and marking). The concept of cold-forming addresses these issues and permits the use of glass but creates new challenges in providing a sufficient support to maintain the cold-form shape and provide rigidity. The ability to cold-form a thin glass substrate to the prescribed shape presents the opportunity for a high quality, cost effective solution.

Moreover, the articles described herein are also compatible with coatings and surface treatments that are often desirable. Examples of such coatings include anti-reflective (AR), antiglare (AG) and decorative and/or functional coatings. Examples of such surface treatments include AG surfaces, a haptic surface that provides tactile feedback, and the like. AR and AG coatings and AG surfaces may improve display visibility in a variety of challenging ambient lighting conditions. High-quality multi-layer AR coating processes are typically applied utilizing vapor deposition or sputter coating techniques. These techniques are usually limited to deposition on flat surfaces due to the nature of the process. Providing these coatings on a curved three dimensional surface is challenging and further adds to the cost of the process. Decorative ink coatings can be applied to a variety of shaped/curved surfaces, however the process to apply these coating to flat surfaces are simpler, better established, and more cost effective. Further, surface treatments (typically formed by etching treatments) are also typically applied to flat surfaces.

Additional disclosure relevant to cold-forming 3D shapes can be found in PCT/US2015/039871 (WO2016/007815) to MacFarland et al., entitled "Cold formed glass applique"; the disclosure of which is incorporated by reference in its entirety.

In some embodiments, cold-formed cover glass articles are provided, including articles with a complex 3D shape, as well as the forming process to make these cover glass articles. The glass layer in these cold-formed 3D cover glass articles is preferably strengthened glass, including thermally tempered, chemically strengthened, and/or glass laminates. In some embodiments, more preferably, this glass layer is Corning Gorilla glass.

Thin Corning Gorilla glass has a number of appealing attributes as cover glass for instrument panels and other displays, like, higher scratch resistance, better optical performance, and better impact resistance. The superior surface stress structure, strength and thickness of Corning Gorilla glass enables the use of cold-forming to make 3D shapes, as stated in PCT/US2015/039871 (WO2016/007815), which is incorporated by reference in its entirety.

In some embodiments, new product concepts are proposed—cold-formed 3D cover glass articles, which have a selected combination of flat, conical, cylindrical and other developable surfaces, and involve both inward and outward bending. Structurally, these cold-formed 3D cover glass articles have a top layer of glass, preferably Corning Gorilla glass, with its thickness ranging from 0.3 mm to 2 mm, preferably from 0.3 mm to 1.1 mm, more preferably from 0.3 mm to 0.7 mm; a layer of adhesive, preferably high strength structural adhesive; and a layer of substrate with required 3D shapes, preferably of light-weight structural materials, for example, molded or CNC machined plastics, composites, aluminum alloys. The layer of substrate provides support to cold formed glass, defines the final 3D shapes, and provides mounting features for system integration. In most cases, this substrate layer has one or multiple openings, so that one or more displays can be attached behind the cover glass.

In some embodiments, a new cold-forming process may be used to make the above-mentioned 3D cover glass articles. In the new process, a roller (preferably of soft materials, for examples, of Teflon) is used to push the thin glass layer to conform to the shape of the substrate, after a layer of adhesive is applied on the substrate. Behind the roller, a flexible mold with multiple stiff pins (also preferably coated with Teflon, so as to avoid the issue of scratching glass) is closed to hold the cold formed glass in place.

In some embodiments, the flexible mold can be as wide as the top thin glass. In another case it also can be as narrow as 10 mm. In the latter case, the flexible mold can also be applied along the both edges and/or along the center line. In most cases, the roller starts from one side of the cover glass item, and moves toward the other end while aligned with the generation line of the developable surface. This method can avoid glass buckling and compound bending in the process of cold-forming, and hence can eliminate the risk of glass breakage caused by unwanted glass buckling and compound bending, and can enable cold bending to a smaller radius.

Some embodiments described herein have at least one of many advantages listed below:
i. Cold-formed 3D cover glass articles with Gorilla glass inherit from the family of Corning Gorilla glass with a number of appealing physical attributes, like, higher scratch resistance, better optical performance, and better impact resistance.
ii. Proposed cold-formed 3D cover glass articles have an extended selection of more complex surfaces, which can not only increase aesthetic functions of cover glass articles, but also can extend design freedom for the display underneath and the physical body around.
iii. The new process proposed to make the cold-formed 3D cover glass articles can avoid glass buckling and compound bending in the process of cold-forming, potentially eliminating the risk of glass breakage caused by unwanted glass buckling and compound bending, and enable cold bending to a smaller radius.
iv. The new process is a low-cost manufacturing path for complex 3D cover glass, replacing hot or thermal forming.

The figures are not necessarily drawn to scale. The different parts of various figures may have some parts not drawn to scale relative to other parts in order to better illustrate concepts.

FIG. 1 illustrates a corresponding 3D view 100 of an exemplary non-planar rigid substrate. The substrate 110 has a complex developable 3D shape, and may include one or more flat, conical, cylindrical surfaces, both inward and outward.

In some embodiments, the substrate 110 with required 3D shapes is preferably made of light-weight structural materials like molded or Computer Numeric Control (CNC) machined plastics, composites, or aluminum alloys. For auto interiors, molded plastic is most preferred. Preferably, it is made by a low-cost molding process, but it may be CNC-machined.

The substrate 110 provides support to the cold formed glass, defines the final 3D shapes, and provides mounting features for system integration. In some embodiments, the rigid substrate 110 may optionally have one or more display openings 120, so that one or more displays 410 can be attached behind the thin glass layer 310. The display openings 120 can be placed either on planar or curved portions of the substrate 110, including conical, cylindrical or other developable surfaces.

Figure 2:
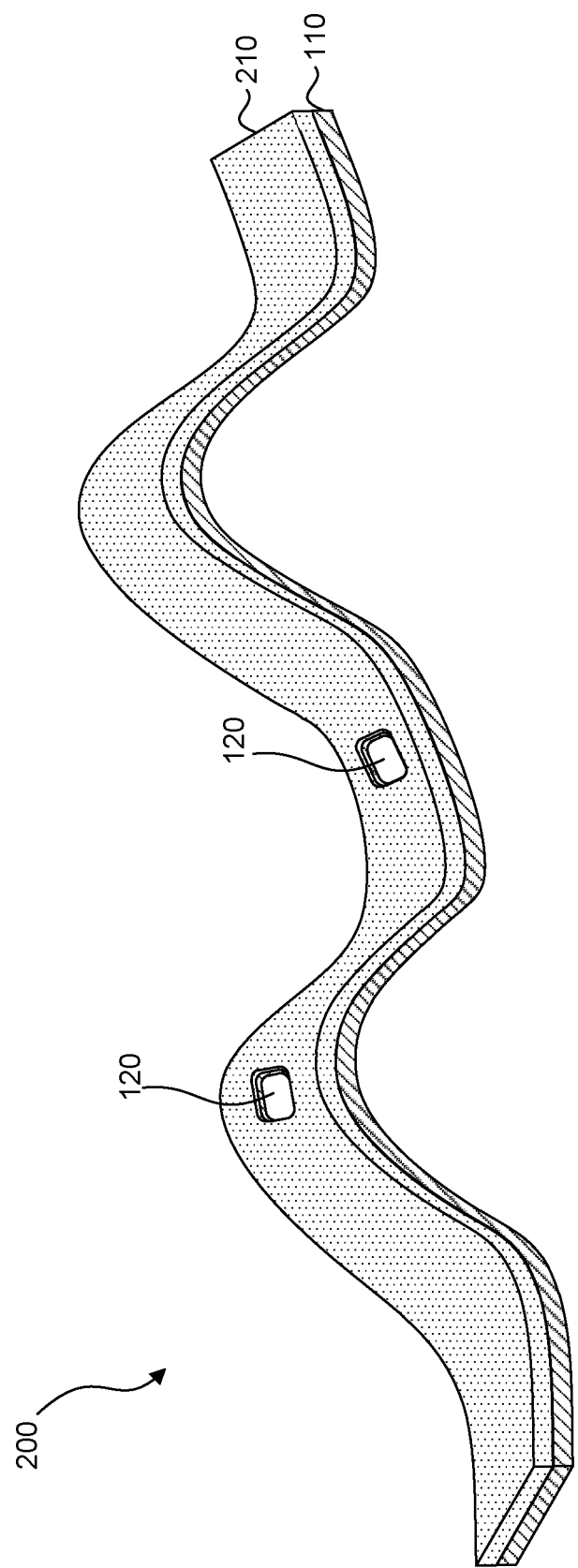
FIG. 2 illustrates an adhesive layer applied on the non-planar rigid substrate.

FIG. 2 illustrates a 3D view 200 of an exemplary adhesive layer applied on the substrate 110. The adhesive layer 210 applied on the substrate 110 is preferably a high-strength structural adhesive material with high optical transparency. Exemplary high-strength structural adhesives include Loctite high-purity M-121 HP Epoxy, 3M Scotch Weld DP 420 Epoxy, Loctite H4800 Acrylics, 3M Auto Glass Windshield Urethane, and CRL Dow Corning 995 Silicone.

In some embodiments, the adhesive layer 210 may also have one or more openings precisely aligned with the display openings 120, as illustrated in FIG. 2, such that one or more displays 410 can be attached behind the thin glass layer 310.

Figure 3:
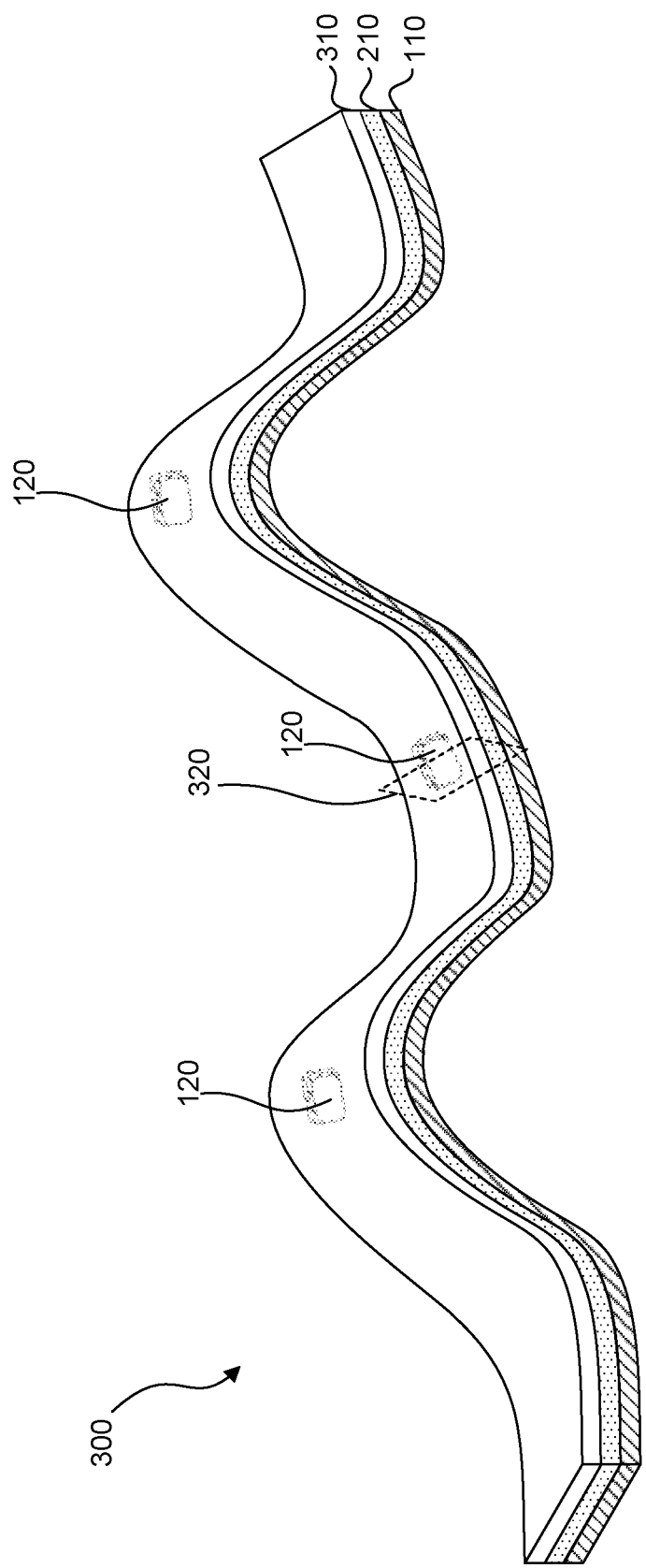
FIG. 3 illustrates a cold-formed 3D cover glass article with a complex developable 3D shape and display openings.

FIG. 3 illustrates a view of a cold-formed 3D glass article 300 having a complex developable 3D shape. The cold-formed 3D glass article 300 may have one or more display openings 120 placed either on planar or curved portions of the substrate 110. The thin glass layer 310 is pressed against the adhesive layer 210 by initially applying a force along a generation line to conform to the shape of the substrate 110. The generation line moves across the substrate 110 to cold-form the thin glass layer into the shape of the substrate 110, while maintaining the application of force on areas of the substrate 110 over which the generation line has passed. The application of force is maintained on areas of the substrate 110 over which the generation line has passed until the adhesive layer 210 cures.

In some embodiments, the shape of the thin glass layer 310 over the display openings 120 is conformal, may or may not be planar, and is defined by the shape of the substrate adjacent to the display openings 120.

In some embodiments, the thin glass layer 310 of a cold-formed 3D cover glass article 300 has a thickness ranging from 0.05 mm to 3 mm, 0.05 mm to 2 mm; 0.05 mm to 1.5 mm, 0.05 mm to 1.0 mm, 0.05 mm to 0.5 mm, 0.05 mm to 0.1 mm, 0.1 mm to 3 mm, 0.1 mm to 2 mm; 0.1 mm to 1.5 mm, 0.1 mm to 1.0 mm, 0.1 mm to 0.5 mm, 0.3 mm to 3 mm, 0.3 mm to 2 mm, 0.3 mm to 1.5 mm, 0.3 mm to 1.1 mm, 0.3 mm to 0.7 mm, 0.4 mm to 0.7 mm, or within any range having any two of these values as endpoints.

In some embodiments, the thin glass layer 310 is preferably a layer of Corning Gorilla glass. Corning Gorilla glass has a number of appealing mechanical and optical attributes as cover glass for instrument panels and other displays, such as, higher scratch resistance, better optical performance, and better impact resistance. Corning Gorilla glass also enables the use of tight cold bending radii, because of its high CS (compressive stress) and deep DOL (depth of layer with compressive stress) on glass surface.

Figure 4:
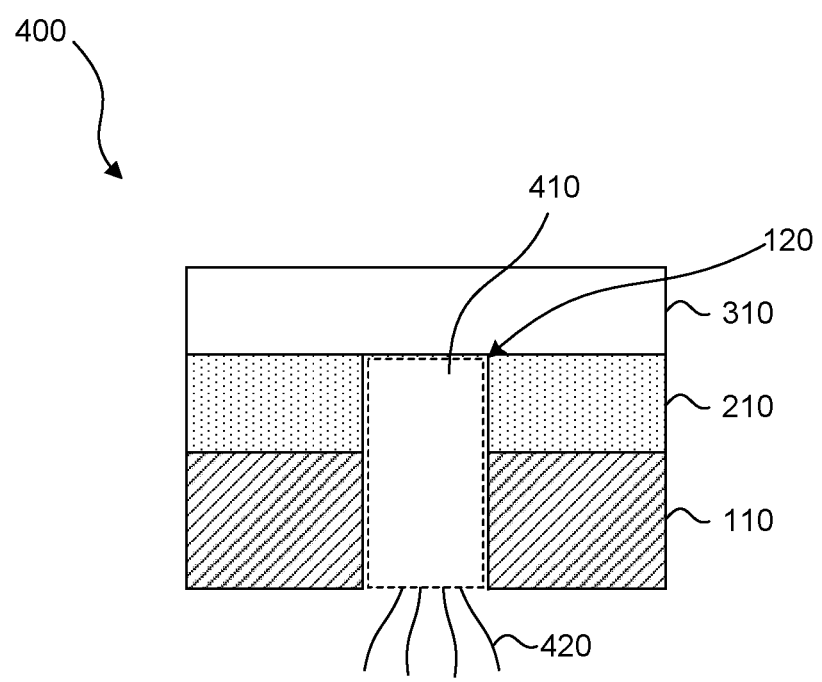
FIG. 4 shows a planar cross-sectional view of the cold-formed 3D glass article.

FIG. 4 illustrates a planar cross-section view 400 of a cold-formed 3D cover glass article 300 along the plane 320, depicted in FIG. 3. The cross-sectional view illustrates the display opening 120 through the substrate 110 and the adhesive layer 210, and an exemplary arrangement of a display 410 attached behind the thin glass layer 310 with electrical connections 420.

In some embodiments, the substrate 110 may either be CNC machined or molded by a low-cost molding process, such as, press molding or injection molding. The mold used for producing the substrate 110 may intrinsically be designed to have the display openings 120. In some embodiments, the display openings 120 can also be created after the substrate has been molded.

In some embodiments, as used herein, "flaws" refer to cracks in the glass. "Flaw size" refers to the depth of such cracks, typically measured in microns (um).

Figure 5:
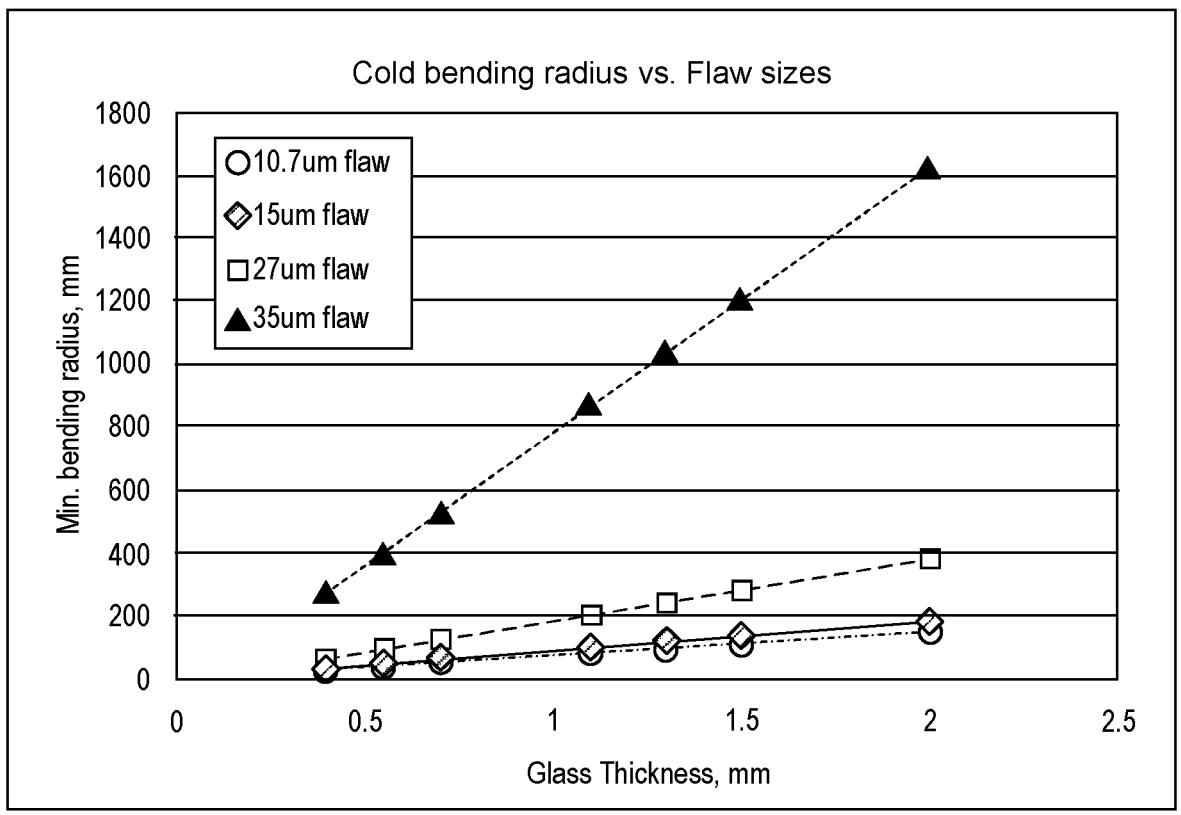
FIG. 5 is a graph showing recommendable bending radii for various thicknesses of Gorilla glass with multiple flaw levels.

FIG. 5 shows a graph of the minimum recommended bendable radii for cold bending of various thickness Gorilla glass with different levels of flaw sizes. Glass strength may significantly dependent on the level of flaw sizes. Gorilla glass as fresh, processed by a standard Corning process, has 99.9% of flaws less than 10.7 um. Gorilla glass' deep CS layer can help its scratch resistance compared to other glass such as floated Soda Lime glass. However, there are certain applications which can expose Gorilla glass to a high level of flaw sizes. In FIG. 5, the minimum bendable radius is analyzed at four different levels of flaw sizes, 10.7 um, 15 um, 27 um and 35 um. For most Gorilla glasses, it is not recommended to use as convex cold-formed surfaces if its flaw levels are bigger than 35 um. Specially treated Gorilla glass is recommended for such deep level of flaws. But, other glasses may be used.

In some embodiments, cold-formed 3D cover glass articles, proposed in this disclosure, have a minimum bending radius as shown in 10.7 um line of FIG. 5 for its bent portions of surfaces including conical, cylindrical, and other developable surfaces.

In some embodiments, the recommended minimum radius for each thickness of Gorilla glass may be reduced by employing a better controlled manufacturing and handling process with a lower level of flaw sizes.

Figure 6:
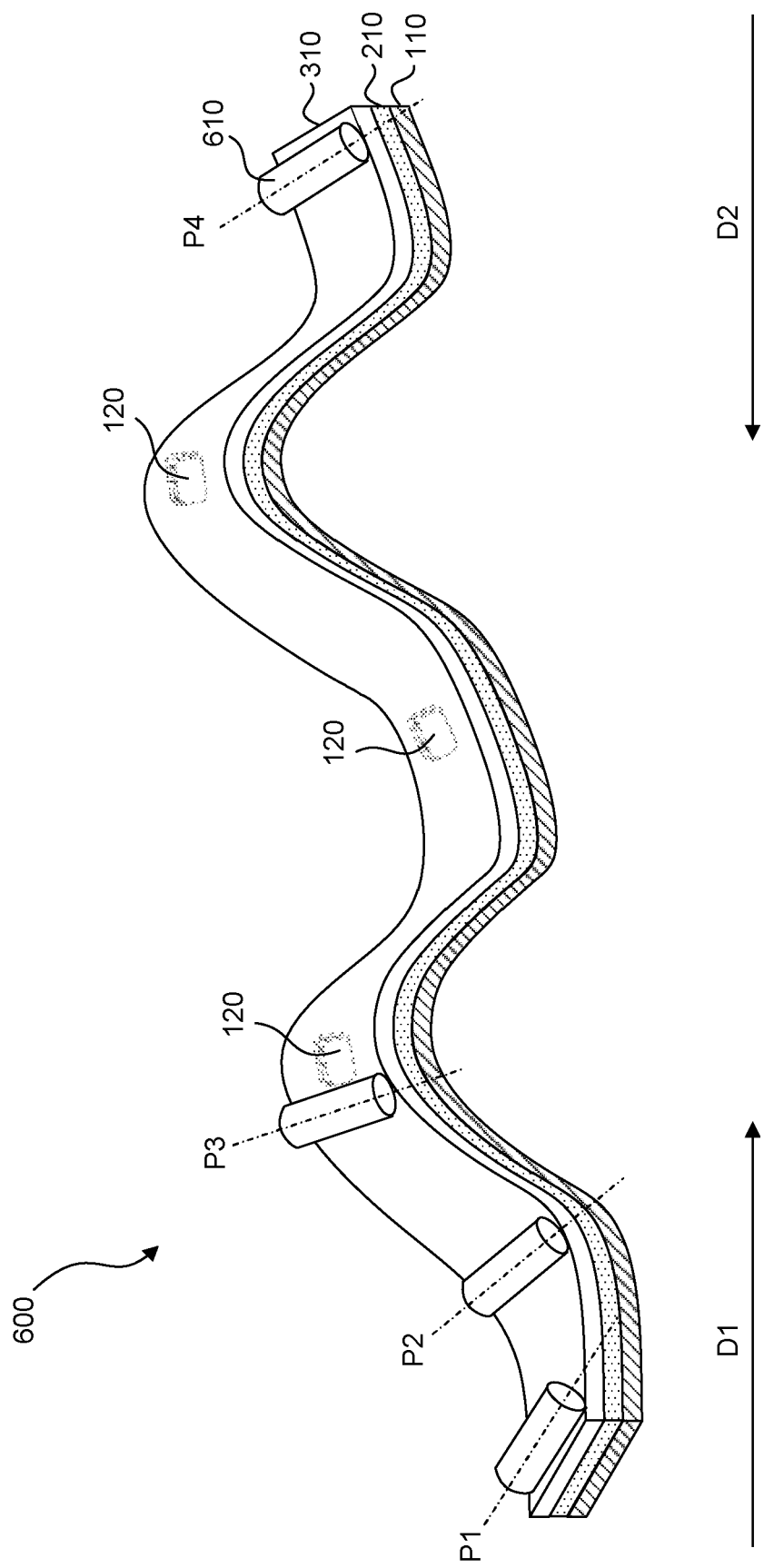
FIG. 6 illustrates the roller aligning with the generation line of developable surfaces when pressing down against the top glass.

FIG. 6 illustrates a view 600 of the cold-formed 3D cover glass article 300. The roller 610 moves across the substrate 110, pressing down against the thin glass layer 310 while aligned with the generation line of developable surface. In some embodiments, the roller 610 moves from one end of the substrate 110 to the other end of the substrate 110, in direction D1, perpendicular to the width of the substrate 110. The positions P1-P2-P3-P4 of the roller 610 as it moves across the substrate 110 are depicted in FIG. 6, merely for illustration purposes. Alternatively, in some embodiments, a plurality of rollers 610 can be used to cold-form the thin glass layer 130.

In some embodiments, the roller 610 can move across the substrate in a direction D2, opposite to D1 and perpendicular to the width of the substrate 110.

In some embodiments, a roller or plurality of rollers 610 may have a swivel mechanism to adjust their orientation so as to contact the entire width of the thin glass layer 310 at any given point while moving across the substrate 110 in a direction. The swivel mechanism may allow the roller to apply and maintain uniform pressure on the thin glass layer at all points along the generation line against the adhesive layer 210 such that the thin glass layer 310 adapts to the shape of the underlying substrate 110.

In some embodiments, the roller 610 may be made of a soft material, for example, Polytetrafluoroethylene (PTFE) to avoid scratching the thin glass layer 310. Scratches or indentations on the thin glass layer 310 can introduce defects or micro-cracks in the glass, compromising the superior surface stress structure and strength of the glass article made therefrom.

Figure 7:
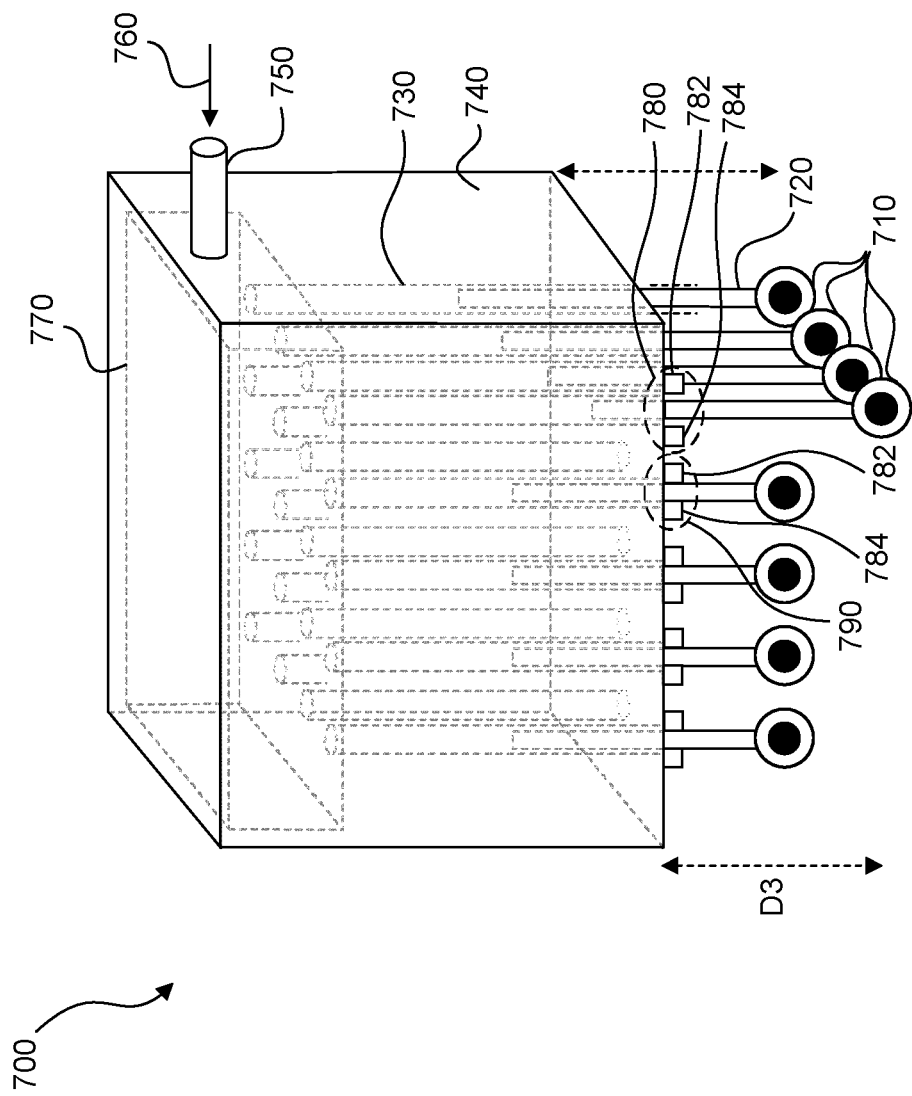
FIG. 7 illustrates a 3D view of a roller tape having an array of rollers with a column of rollers individually activated.

FIG. 7 shows a wide roller tape 700. The wide roller tape 700 comprises a wide roller block 740 and an array of rollers wherein each of the rollers 710 is attached to one end of the pins 720. The wide roller block 740 houses a pressure chamber 770, connected with an inlet connector 750, to apply and maintain a constant pressure on the pins 720 through cavities 730. The movement of the pins 720 in the vertical direction, denoted by D3, can be controlled by an actuator mechanism.

In some embodiments, the rollers 710 may be made of material selected from the group consisting of ceramics, polymers, metals, composites and combinations thereof. The rollers 710 may also be coated with a soft material such as, but not limited to, Polytetrafluoroethylene (PTFE), to avoid scratching the thin glass layer 310.

In some embodiments, the pins 720 may have a cross-section selected from the group consisting of cylindrical, triangular, and rectangular. The pins 710 may be made of a material selected from the group consisting of metals, ceramics, plastics, composites, rubber, and combinations thereof. In some embodiments, the roller tape may have at least a pin, at least a row of pins, at least a column of pins, or a combination thereof.

The wide roller block 740 may have cavities 730 drilled or machined through a portion of its height such that the pins 720 can move up and down determined by the portion of the substrate against which the thin glass layer 310 is being pressed. The length of the pins protruding out of the wide roller block 740 can be adjusted using a clamping mechanism. In some embodiments, the clamps 782 and 784 operate by receiving an input signal from an actuator, for example, clamps 782 and 784 are shown in a locked configuration 790 and clamps 782 and 784 are shown in an unlocked configuration 780.

The actuator mechanism may be selected from the group comprising hydraulic, pneumatic, electric, and mechanical input signals, or combinations thereof. In FIG. 7, a column of pins 720 has been actuated to press the thin glass layer 310 against the adhesive layer 210 applied on the substrate 110. In some embodiments, an individual pin 720, a column of pins 720, a row of pins 720, or any combinations thereof can be actuated to apply or not apply the force on the thin glass layer 310.

In some embodiments, a column of pins 720 can be sequentially actuated such that the initial force is applied by actuating one or more pins; the generation line is defined by the position of the pins most recently actuated; and the application of force is maintained by actuated pins that do not move relative to the substrate 110 after the generation line has passed, and until the adhesive layer 210 is cured.

In some embodiments, all pins 720 in a wide roller tape 700 may be simultaneously actuated, with the clamps 782 and 784 in the unlocked configuration 780, such that the initial force is applied by all the actuated pins 720; the generation line is defined by the position of the column of leading pins 720; moving the generation line across the substrate to cold-form the thin glass layer 310 into the shape of the substrate 110, while maintaining the application of force on areas of the substrate 110 over which the generation line has passed; maintaining the application of force on areas of the substrate 110 over which the generation line has passed until the adhesive layer 210 cures.

In some embodiments, the cavities 730 are connected to the pressure chamber 770. The pressure in the pressure chamber 770 can be created by any suitable means 760, such as compressed air or oil through the inlet connector 750.

In some embodiments, a flexible mold may be used to apply and/or maintain the application of force on areas of the substrate 110 over which the generation line has passed. The flexible mold may be made of polytetrafluoroethylene (PTFE), or other such materials.

In some embodiments, the rollers 710 have a radius smaller than the smallest bending radius of the substrate 110. The radius of the roller may be less than 50 mm, less than 45 mm, less than 40 mm, less than 35 mm, less than 30 mm, less than 25 mm, less than 20 mm, less than 18 mm, less than 16 mm, less than 14 mm, less than 12 mm, less than 10 mm, less than 8 mm, less than 6 mm, less than 5 mm, less than 4 mm, less than 3 mm, less than 2 mm, or within any range having any two of these values as endpoints.

In some embodiments, the radius of the rollers 710 is 50% of the smallest bending radius of the substrate 110, 40% of the smallest bending radius of the substrate 110, 30% of the smallest bending radius of the substrate 110, 20% of the smallest bending radius of the substrate 110, 15% of the smallest bending radius of the substrate 110, 10% of the smallest bending radius of the substrate 110, 5% of the smallest bending radius of the substrate 110, or within any range having any two of these values as endpoints.

Figure 8:
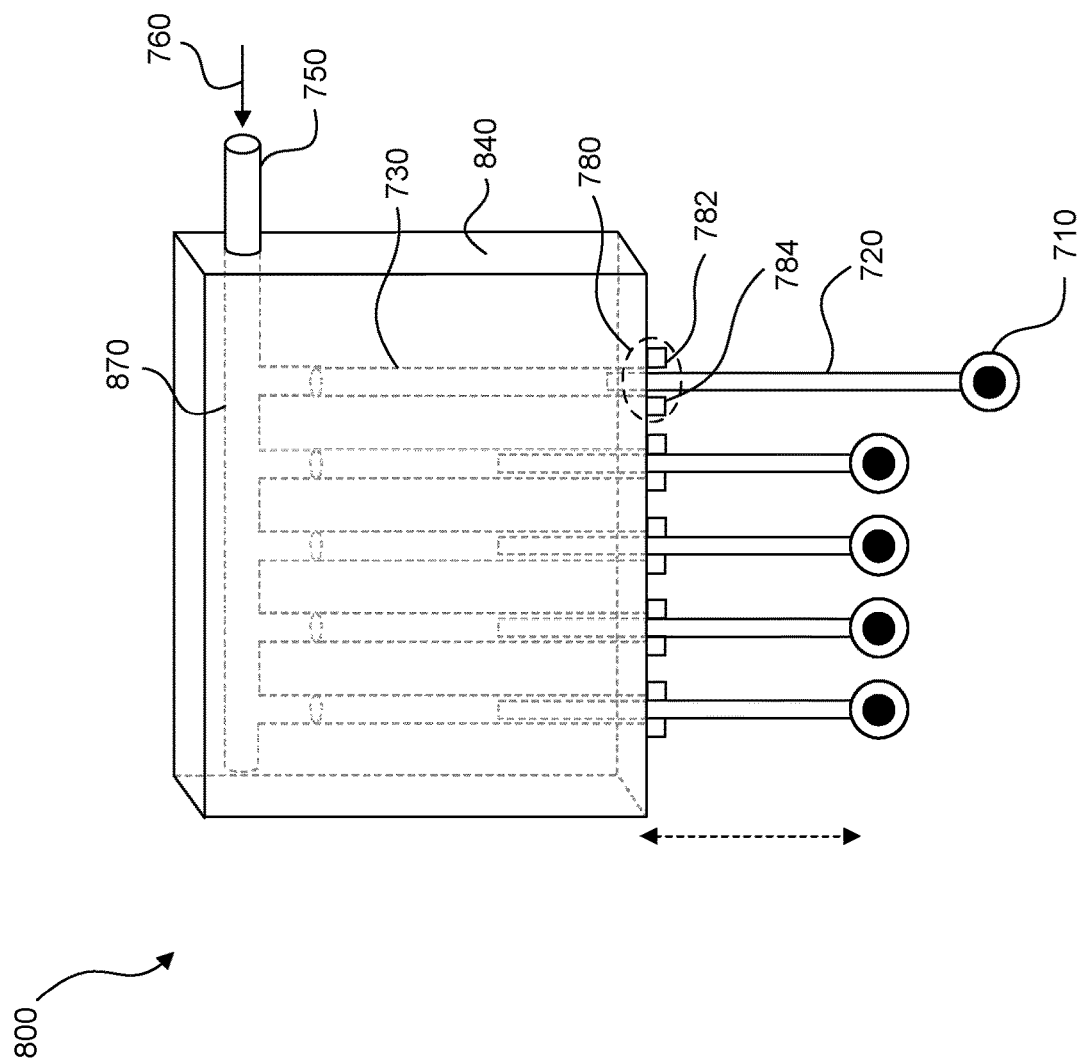
FIG. 8 illustrates a 3D view of the roller tape having a row of rollers with a single roller individually activated.

FIG. 8 illustrates a narrow roller tape 800. The narrow roller tape 800 comprises a narrow roller block 840 and a row of rollers wherein each of the rollers 710 is attached to one end of the pins 720. The narrow roller block 840 houses a pressure manifold 870, connected with an inlet connector 750, to apply and maintain a constant pressure on the pins 720 through cavities 730. The movement of the pins 720 in the vertical direction, denoted by D3, can be controlled by an actuator mechanism.

Figure 9:
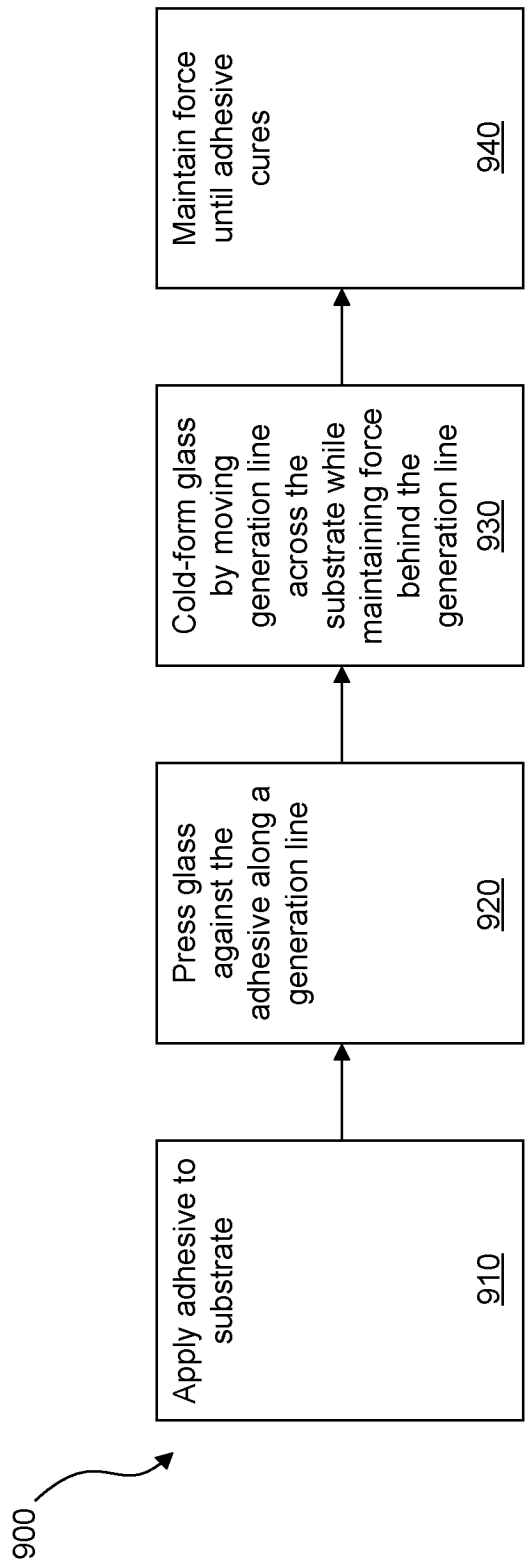
FIG. 9 shows a process flowchart of a cold-forming process for 3D cover glass articles.

FIG. 9 shows a process flowchart for a cold-forming process for 3D cover glass articles. The following steps are performed, in order:
Step 910: applying adhesive layer 210 to substrate 110;
Step 920: pressing the thin glass layer 310 against the adhesive layer 210;
Step 930: cold-forming the thin glass layer 310 by moving the generation line across the substrate while maintaining force behind the generation line; and
Step 940: maintaining force on areas where the generation line has passed until the adhesive layer 210 cures.

Figure 10:
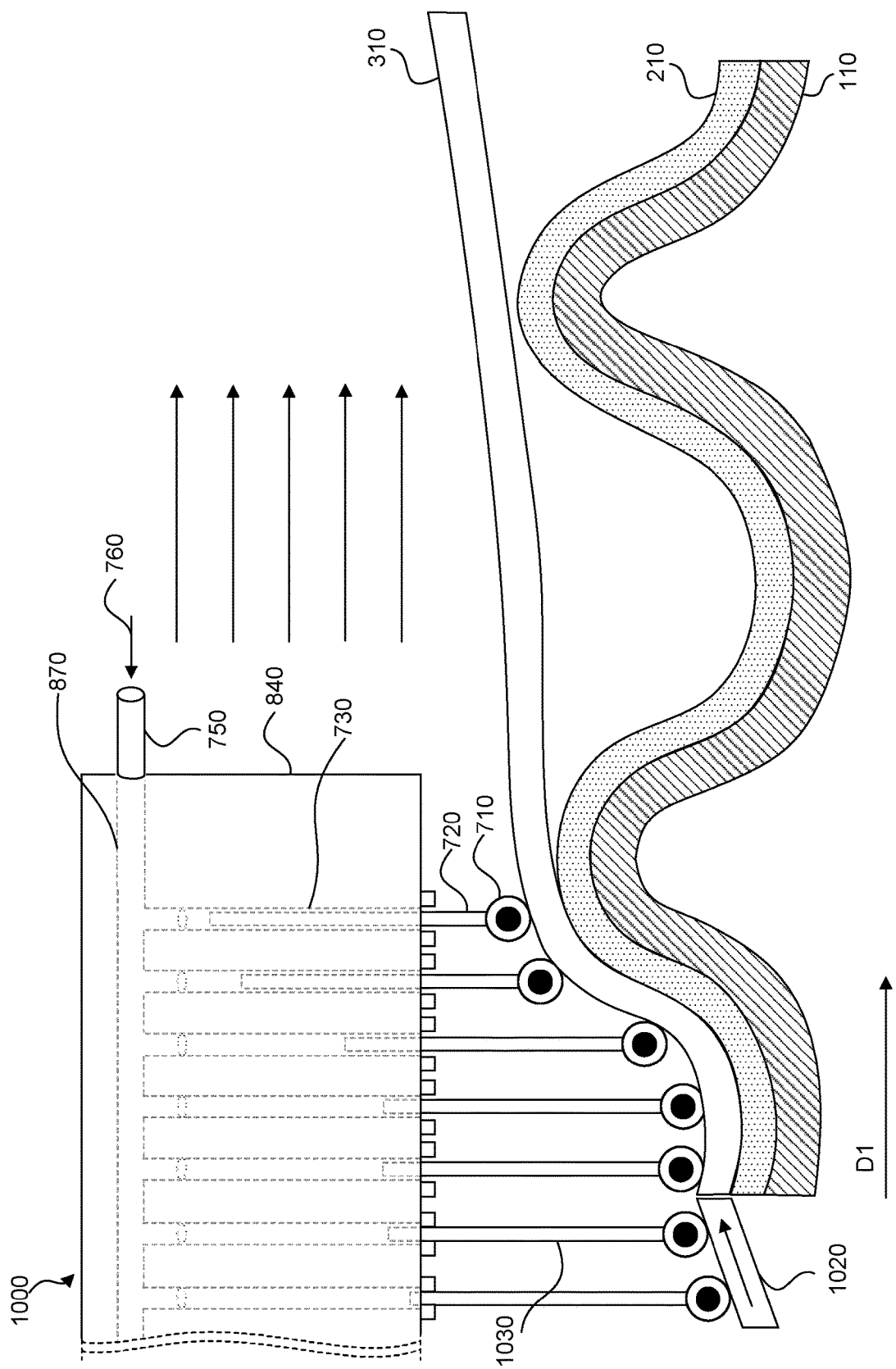
FIG. 10 illustrates the cold-forming process wherein the roller tape moves across the substrate, pressing the thin glass layer against the adhesive layer.

FIG. 10 illustrates a step 1000 of an exemplary process of cold-forming 3D cover glass articles using a narrow roller tape 840. In some embodiments, the narrow roller tape 840 comprises a plurality of pins 720 pressing against the thin glass layer 310 and a plurality of pins 1030 not pressing against the thin glass layer 310. The plurality of pins not pressing against the thin glass layer 310 may be stationed on the ramp 1020 prior to rolling on to the thin glass layer 310. The generation line moves as the narrow roller tape 840 moves across the substrate 110, while maintaining force behind the generation line.

Figure 11:
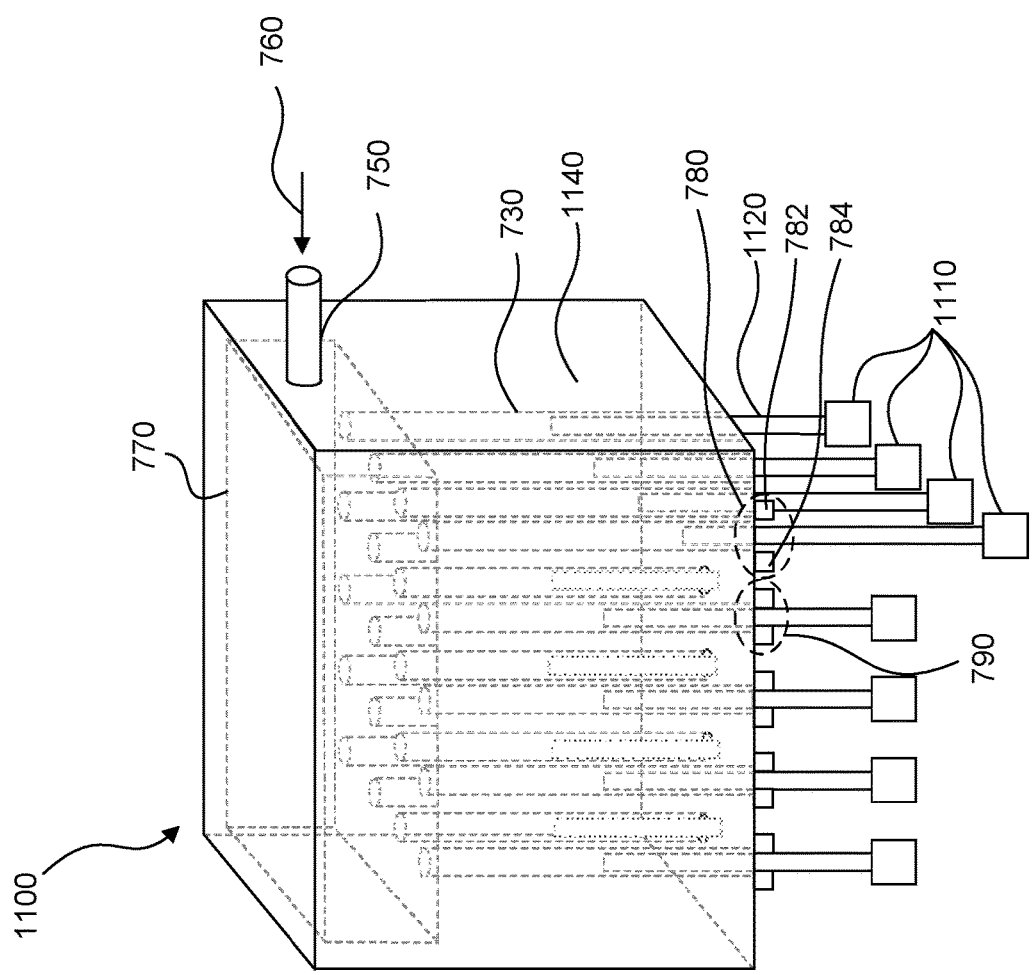
FIG. 11 illustrates a 3D view of a mold having an array of pins.

FIG. 11 shows a wide soft-pin mold 1100. The wide soft-pin mold 1100 comprises a wide soft-pin block 1140 and an array of soft-pins 1120. Each of the soft-pins 1120 has at least a soft tip 1110 attached on one end. The soft-pin block 1140 houses a pressure chamber 770, connected with an inlet connector 750, to apply and maintain a constant pressure on the soft-pins 1120 through cavities 730.

In some embodiments, the soft tip 1110 may be made of a material able to adapt its shape to that of the thin glass layer and underlying substrate. For example, elastic materials, viscoelastic and/or elastomeric materials may be used. Any suitable material may be used.

In some embodiments, a column of soft-pins 1120 can be sequentially actuated such that the initial force is applied by actuating one or more soft-pins; the generation line is defined by the position of sequentially actuated soft-pins; and the application of force is maintained by actuated soft-pins that do not move relative to the substrate 110 after the generation line has passed, and until the adhesive layer 210 is cured.

In some embodiments, a plurality of rollers, a plurality of pins, a plurality of soft-pins or a combination thereof may start at any point between the two ends of the substrate along direction D1, and move towards either ends of the substrate, ensuring application and maintenance of pressure across the entire substrate 110. Such an arrangement, although comprehensible, would be non-ideal with regards to manufacturability and cost optimization.

Figure 12:
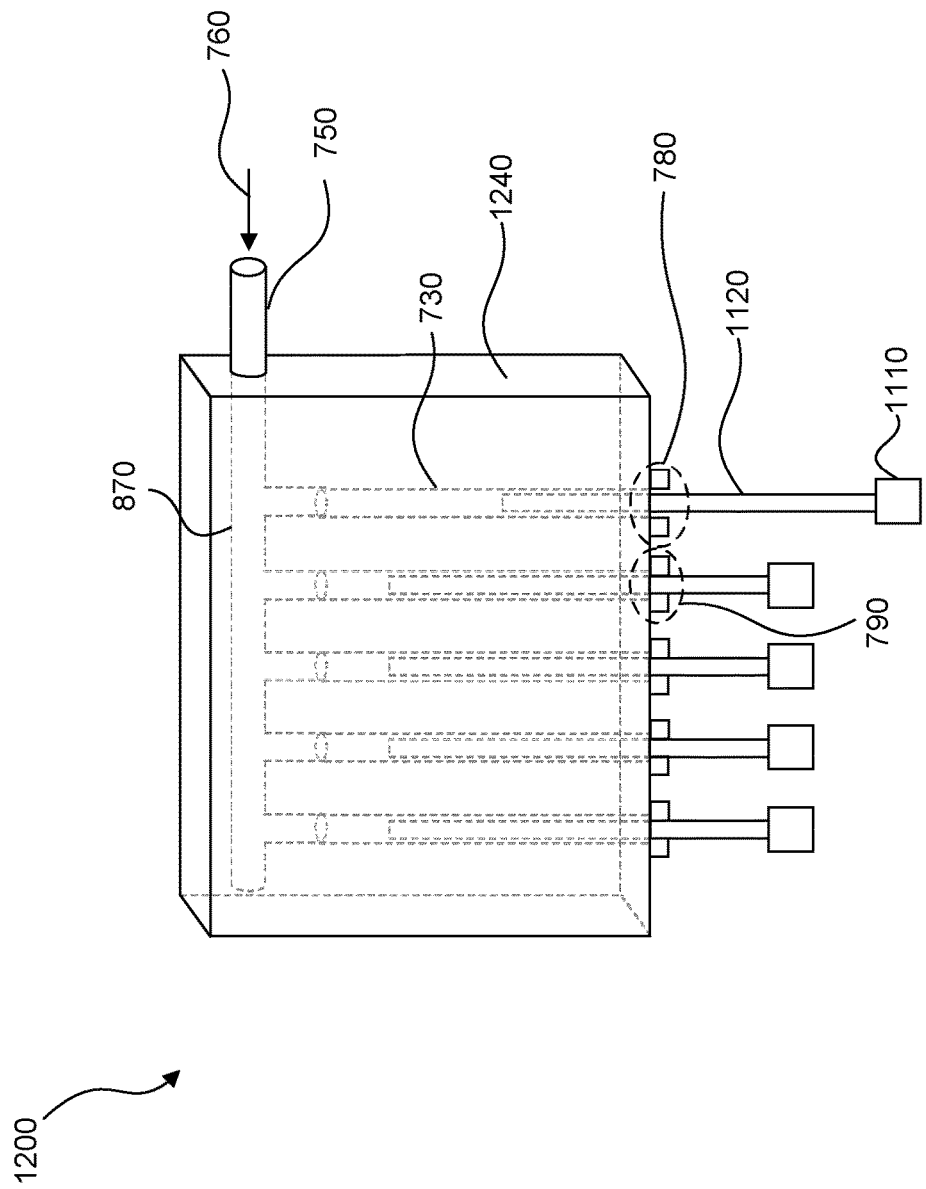
FIG. 12 illustrates a 3D view of a mold having a row of pins with a single pin individually activated.

FIG. 12 illustrates a narrow soft-pin mold 1200. The narrow soft-pin mold 1200 comprises a narrow soft-pin block 1240 and a row of soft-pins 1120. Each of the soft-pins 1120 has at least a soft tip 1110 attached on one end. The narrow soft-pin block 1240 houses a pressure manifold 870, connected with an inlet connector 750, to apply and maintain a constant pressure on the pins 720 through cavities 730. The movement of the soft-pins 1120 in the vertical direction, denoted by D3, can be controlled by an actuator mechanism.

Figure 13:
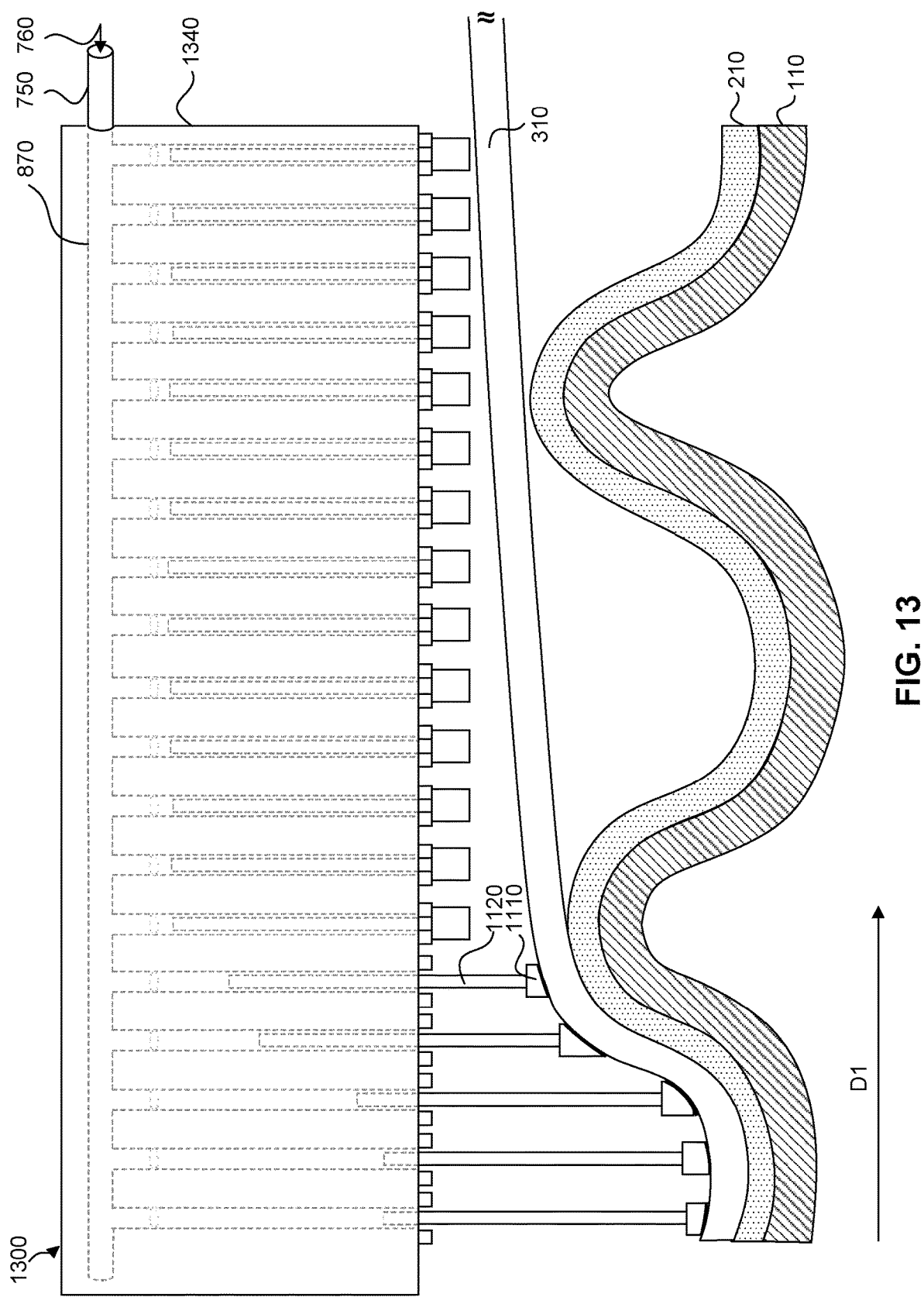
FIG. 13 illustrates the cold-forming process wherein the mold having pins moves across the substrate, pressing the thin glass layer against the adhesive layer.

FIG. 13 illustrates a step 1300 of an exemplary process of cold-forming 3D cover glass articles using a soft-pin mold 1340. The soft tip 1110 attached to one end of the soft-pins 1120 when pushed against the glass adapts to the curvature of the thin glass layer 310, maintaining a uniform force on areas of the substrate 110 over which the generation line has passed.

Figure 14:
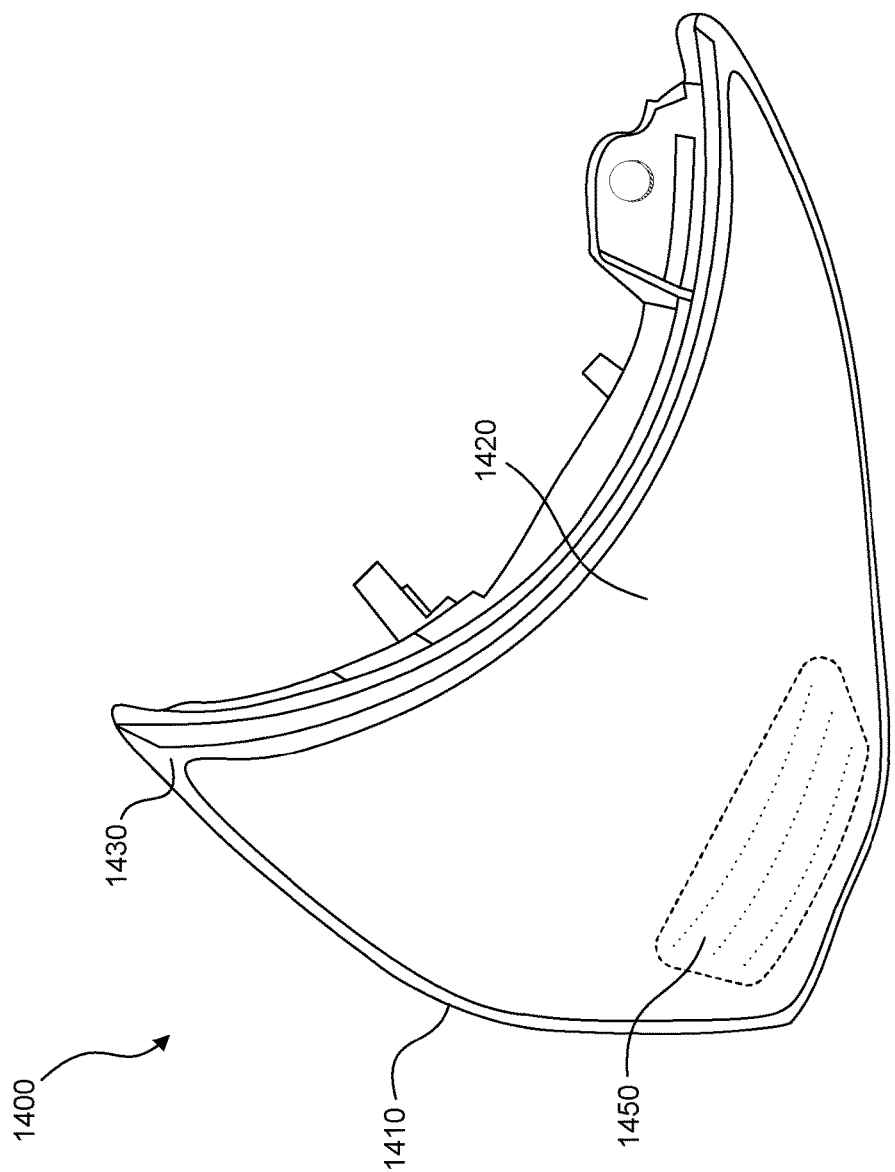
FIG. 14 illustrates an automotive interior display comprising a cold-formed glass substrate bonded to a non-planar rigid support structure.

FIG. 14 shows an example of a part 1400, a section of an automotive interior display, including but not limited to an instrument cluster, a console display, or a center stack display, having a monitor, that may be made in some embodiments. A cold-formed glass substrate is bonded to a rigid support structure 1430. Cold-formed glass substrate 1410 includes an open region 1450 that is not in direct contact with non-planar rigid support structure 1420. Open region 1450 has a curved shape maintained by the non-planar rigid support structure 1420. A monitor may be laminated to open region 1450. Rigid support structure 1430 may be designed to be attached to other parts of an automobile.

Figure 15:
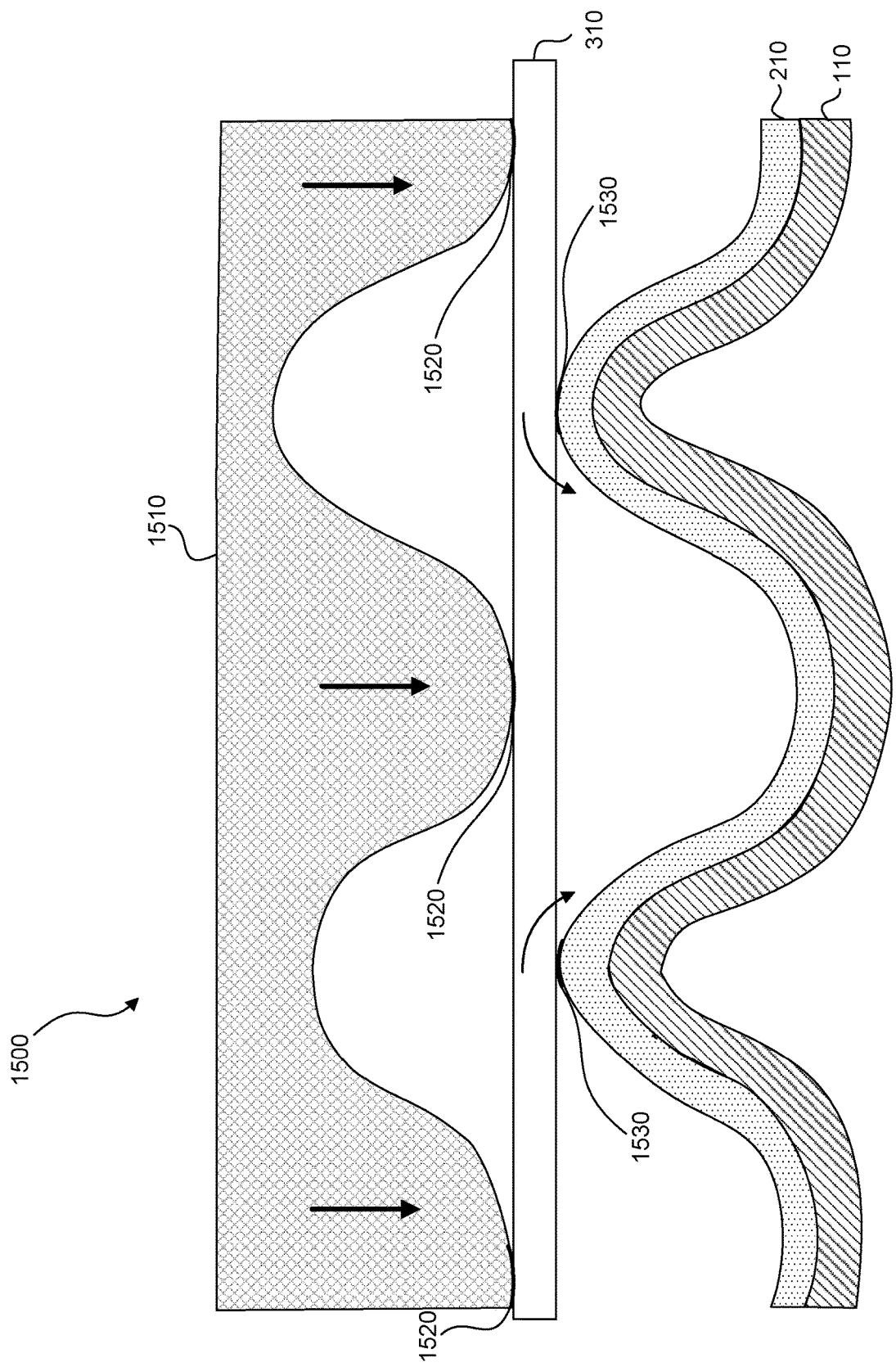
FIG. 15 illustrates an exemplary press molding process wherein a mold is pressed against the thin glass layer to conform to the complex shape of the substrate.

FIG. 15 shows an exemplary press molding process 1500. The process comprises pushing the press mold 1510 against the thin glass layer 310, contacting at mold-to-thin glass contact points 1520 and thin glass-to-adhesive contact points 1530. The thin glass layer and/or the underlying substrate may be preheated to glass softening temperature to facilitate the molding process. During bonding, as the press mold 1510 pushes down on the thin glass layer 310 against the adhesive layer 210 and the underlying substrate 110. Tensile stresses, compressive stresses or a combination thereof may be generated in the thin glass layer 310. This stress may result in breakage for some percentage of articles, reducing yield. Furthermore, the thin glass layer 310 slides against the uncured adhesive layer 210 potentially affecting the thickness uniformity and the conformality of adhesive layer 210. Some embodiments described herein improve upon the press molding process, particularly for articles having a developable and/or complex developable shape, by reducing or avoiding stress in the thin glass layer during processing, thereby increasing yield relative to press molding and similar processes.

On the other hand, the process of cold formed 3D glass articles proposed herein can overcome such drawbacks since during bonding of the thin glass layer to the substrate, the generation line moves across the thin glass layer to sequentially press different parts of the thin glass layer against the substrate. In some embodiments, parts of thin glass layer 310 (See, for example, FIG. 13) over which the generation line has not yet passed are not pressed toward substrate 110. While parts of thin glass layer 310 over which the generation line has not yet passed may at times contact adhesive layer 210, the stress thin glass layer 310 caused by such contact is reduced relative to press molding because, in some embodiments, there is no applied downward force, or only incidental force significantly less than that usually applied during press molding, on any parts of thin glass layer 310 over which the generation line has not yet passed.

Aspect (1) of this disclosure pertains to a process comprising: applying an adhesive layer to a substrate having a developable shape; initially applying a force to press a thin glass layer against the adhesive layer along a generation line; moving the generation line across the substrate to cold-form the thin glass layer into the shape of the substrate, while maintaining the application of force on areas of the substrate over which the generation line has passed; and maintaining the application of force on areas of the substrate over which the generation line has passed until the adhesive cures.

Aspect (2) of this disclosure pertains to the process of Aspect (1), wherein the substrate has a non-planar developable shape.

Aspect (3) of this disclosure pertains to the process of Aspect (1), wherein the substrate has a complex developable shape, the substrate having a first portion with a planar shape and a second portion with a curvature.

Aspect (4) of this disclosure pertains to the process of Aspect (1), wherein the substrate has a complex developable shape, the substrate having a first portion with a convex curvature and a second portion with a concave curvature.

Aspect (5) of this disclosure pertains to the process of Aspect (2), wherein: the force is initially applied by a first roller of a roller tape having a plurality of rollers; the generation line is defined by the first roller to pass over an area of the substrate; and the application of force is maintained by at least one of the plurality of rollers.

Aspect (6) of this disclosure pertains to the process of Aspect (3), wherein each of the plurality of rollers is attached to at least one pin.

Aspect (7) of this disclosure pertains to the process of Aspect (4), wherein a constant pressure on each pin is maintained by an actuator mechanism.

Aspect (8) of this disclosure pertains to the process of Aspect (5), wherein the actuator mechanism is selected from the group consisting of hydraulic, pneumatic, electric, and mechanical.

Aspect (9) of this disclosure pertains to the process of Aspect (4), wherein a pressure chamber applies a common pressure on each pin that is attached to a roller that is applying force on areas of the substrate.

Aspect (10) of this disclosure pertains to the process of Aspect (2), wherein a flexible mold is used to maintain the application of force on areas of the substrate over which the generation line has passed.

Aspect (11) of this disclosure pertains to the process of Aspect (2), wherein the process is performed using an array of pins controllable by actuators to either apply force or not apply force; the initial force is applied by actuating one or more pins; the generation line is defined by the position of sequentially actuated pins; and the application of force is maintained by actuated pins that do not move relative to the substrate after the generation line has passed, and until the adhesive is cured.

Aspect (12) of this disclosure pertains to the process of any one of Aspects (1) through Aspect (11), wherein a uniform force is maintained on areas of the substrate over which the generation line has passed.

Aspect (13) of this disclosure pertains to the process of any one of Aspects (1) through Aspect (12), wherein the generation line moves across the substrate at all points in the direction of a non-zero principal curvature of the substrate.

Aspect (14) of this disclosure pertains to the process of any one of Aspects (1) through Aspect (13), wherein the adhesive layer is a structural adhesive having high optical transparency.

Aspect (15) of this disclosure pertains to the process of any one of Aspects (1) through Aspect (14), wherein the thin glass layer has a thickness of 0.05 mm to 2 mm.

Aspect (16) of this disclosure pertains to the process of any one of Aspects (1) through Aspect (15), wherein the thin glass layer has a thickness of 0.3 mm to 1.1 mm.

Aspect (17) of this disclosure pertains to the process of Aspect (2), wherein the roller has a radius smaller than the smallest bending radius of the substrate.

Aspect (18) of this disclosure pertains to the process of Aspect (2), wherein the roller has a radius of 5 mm to 20 mm.

Aspect (19) of this disclosure pertains to the process of Aspect (16), wherein the radius of the roller is 10% to 20% of the smallest bending radius of the substrate.

Aspect (20) of this disclosure pertains to the process of any one of Aspects (1) through Aspect (19), wherein the substrate comprises an opening over which the thin glass layer forms a developable shape defined by the shape of the substrate adjacent to the opening.

Aspect (21) of this disclosure pertains to an article, formed by the process of applying an adhesive layer to a substrate having a developable shape; initially applying a force to press a thin glass layer against the adhesive layer along a generation line; moving the generation line across the substrate to cold-form the thin glass layer into the shape of the substrate, while maintaining the application of force on areas of the substrate over which the generation line has passed; maintaining the application of force on areas of the substrate over which the generation line has passed until the adhesive cures.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A process, comprising:
    applying an adhesive layer to a substrate having a developable shape;
    initially applying a force to press a thin glass layer against the adhesive layer along a generation line;
    moving the generation line across the substrate to cold-form the thin glass layer into the shape of the substrate, while maintaining the application of force on areas of the substrate over which the generation line has passed; and
    maintaining the application of force on areas of the substrate over which the generation line has passed until the adhesive cures.

2. The process of claim 1, wherein the substrate has a non-planar developable shape.

3. The process of claim 2, wherein:
    the force is initially applied by a first roller of a roller tape having a plurality of rollers;
    the generation line is defined by the first roller to pass over an area of the substrate; and
    the application of force is maintained by at least one of the plurality of rollers.

4. The process of claim 3, wherein each of the plurality of rollers is attached to at least one pin.

5. The process of claim 3, wherein the first roller has a radius smaller than the smallest bending radius of the substrate.

6. The process of claim 5, wherein the radius of the first roller is 10% to 20% of the smallest bending radius of the substrate.

7. The process of claim 3, wherein the first roller has a radius of 5 mm to 20 mm.

8. The process of claim 2, wherein the process is performed using an array of pins controllable by actuators to either apply force or not apply force;
    the initial force is applied by actuating one or more pins;
    the generation line is defined by the position of sequentially actuated pins; and
    the application of force is maintained by actuated pins that do not move relative to the substrate after the generation line has passed, and until the adhesive is cured.

9. The process of claim 8, wherein a constant pressure on each pin is maintained by an actuator mechanism.

10. The process of claim 9, wherein the actuator mechanism is selected from the group consisting of hydraulic, pneumatic, electric, and mechanical.

11. The process of claim 8, wherein a pressure chamber applies a constant pressure on the pins.

12. The process of claim 2, wherein a flexible mold is used to maintain the application of force on areas of the substrate over which the generation line has passed.

13. The process of claim 1, wherein the substrate has a complex developable shape, the substrate having a first portion with a planar shape and a second portion with a curvature.

14. The process of claim 1, wherein the substrate has a complex developable shape, the substrate having a first portion with a convex curvature and a second portion with a concave curvature.

15. The process of claim 1, wherein a uniform force is maintained on areas of the substrate over which the generation line has passed.

16. The process of claim 1, wherein the generation line moves across the substrate at all points in the direction of a non-zero principal curvature of the substrate.

17. The process of claim 1, wherein the adhesive layer is a structural adhesive having high optical transparency.

18. The process of claim 1, wherein the thin glass layer has a thickness of 0.05 mm to 2 mm.

19. The process of claim 1, wherein the substrate comprises an opening over which the thin glass layer forms a developable shape defined by the shape of the substrate adjacent to the opening.

* * * * *